United States Patent
Farrugia et al.

(10) Patent No.: US 8,644,500 B2
(45) Date of Patent: Feb. 4, 2014

(54) APPARATUS AND METHOD FOR BLOCK CIPHER PROCESS FOR INSECURE ENVIRONMENTS

(75) Inventors: Augustin J. Farrugia, Cupertino, CA (US); Thomas Icart, Paris (FR); Mathieu Ciet, Paris (FR)

(73) Assignee: Apple Inc., Cupertino, CA (US)

( * ) Notice: Subject to any disclaimer, the term of this patent is extended or adjusted under 35 U.S.C. 154(b) by 444 days.

(21) Appl. No.: 12/806,768

(22) Filed: Aug. 20, 2010

(65) Prior Publication Data

US 2012/0045050 A1  Feb. 23, 2012

(51) Int. Cl.
 *H04L 29/06* (2006.01)
(52) U.S. Cl.
 USPC ............... 380/28; 380/277; 713/189
(58) Field of Classification Search
 USPC .......................................... 380/28
 See application file for complete search history.

(56) References Cited

U.S. PATENT DOCUMENTS

| 6,563,442 B1 * | 5/2003 | Luna et al. ............ 341/106 |
| 2002/0124179 A1 * | 9/2002 | Kaminaga et al. ........... 713/194 |
| 2006/0034457 A1 * | 2/2006 | Damgaard et al. ............ 380/44 |
| 2009/0252327 A1 | 10/2009 | Ciet et al. |
| 2010/0054461 A1 | 3/2010 | Ciet et al. |
| 2010/0080395 A1 * | 4/2010 | Michiels et al. ............. 380/278 |

FOREIGN PATENT DOCUMENTS

| WO | WO 2008/059420 | 5/2008 |
| WO | WO 2008084433 A2 * | 7/2008 |
| WO | WO 2012/024086 | 2/2012 |

OTHER PUBLICATIONS

Anonymous. (May 14, 2010). "Advanced Encryption Standard," *Wikipedia*, located at <http://en.wikipedia.org/wiki/Advanced_Encryption_Standard> 1 page.
Billet, O. et al. (2005). "Cryptanalysis of a White Box AES Implemenfation," *LNCS* 3357:227-240.
Chow, S. et al. (Oct. 15, 2002). "A White-Box DES Implementation for DRM Applications," *Cloakware Corporation, Pre-proceedings for ACM DRM-2002 Workshop* 16 pages.
International Search Report and Written Opinion for PCT/US2011/046483, Oct. 21, 2011 (completion date), Apple Inc.
International Preliminary Report on Patentability for PCT/US2011/046483, Feb. 26, 2013 (issuance date), Apple Inc.
Link, Hamilton E., et al. "Clarifying Obfuscation: Improving the Security of White-Box DES", Proceedings of the International Conference on Information Technology: Coding and Computing (ITCC'05), Apr. 4-6, 2005, p. 1-6, vol. 1, Las Vegas, Nevada, USA.
Cappaert, Jan, et al. "Towards Tamper Resistant Code Encryption: Practice and Experience", (lecture notes in Computer Science), May 7, 2007, 15 pages, Springer Berlin Heidelberg, Berlin, Germany.

* cited by examiner

*Primary Examiner* — Edward Zee
*Assistant Examiner* — Yogesh Paliwal
(74) *Attorney, Agent, or Firm* — Adeli & Tollen LLP

(57) ABSTRACT

Method and apparatus for increasing security of a cryptographic algorithm such as deciphering, enciphering, or a digital signature using a block type cipher such as AES implemented for instance in a "whitebox" model with the cipher key either known or unknown at the compilation time. This method is secure for use in entrusted environments, particularly for securing cryptographic keys. The look up tables characteristic of such algorithms are protected against attack here by making all such tables of the same size and indistinguishable, and further by masking the output values of such tables, typically where the tables carry out a permutation function or a logical exclusive OR operation.

40 Claims, 5 Drawing Sheets

FIG. 8A  FIG. 8B

APPARATUS AND METHOD FOR BLOCK CIPHER PROCESS FOR INSECURE ENVIRONMENTS

FIELD OF THE INVENTION

This invention relates to data security and cryptography and more generally to improving the security of computer enabled cryptographic processes and algorithms.

BACKGROUND

Cryptographic algorithms are widely used for encryption of messages, authentication, encryption signatures and identification. The well-known DES (Data Encryption Standard) has been in use for a long time, and was updated by Triple-DES, which has been replaced in many applications by the AES (Advanced Encryption Standard).

DES, Triple-DES and AES are exemplary symmetric block ciphers. Block ciphers operate on blocks of plaintext and ciphertext, usually of 64 or 128 bits but sometimes longer. Stream ciphers are the other main type of cipher and operate on streams of plain text and cipher text 1 bit or byte (sometimes one word) at a time. With a block cipher, a particular plain text block will always be encrypted to the same cipher text block using the same key. However; to the contrary with a stream cipher, the same plain text bit or byte will be encrypted to a different bit or byte each time it is encrypted. Hence in the ECB (electronic code book) mode for block ciphers, each plain text block is encrypted independently.

AES is approved as an encryption standard by the U.S. Government. Unlike DES, it is a substitution permutation network. AES is fast to execute in both computer software and hardware implementation, relatively easy to implement, and requires little memory. AES has a fixed block size of 128 bits and a key size of 128, 192 or 256 bits. Due to the fixed block size of 128 bits, AES operates on a 4×4 array of bytes. It uses key expansion and like most block ciphers a set of encryption and decryption rounds (iterations). Each round involves the same processes. Use of multiple rounds enhances security. Block ciphers of this type use in each round a substitution box or s-box. This operation provides non-linearity in the cipher and significantly enhances security.

Note that these block ciphers are symmetric ciphers, meaning the same algorithm and key are used for encryption and decryption, except usually for minor differences in the key schedule. As is typical in most modern ciphers, security rests with the (secret) key rather than the algorithm. The s-boxes or substitution boxes were introduced in DES and accept an n bit input and provide an m bit output. The values of m and n vary with the cipher. The input bits specify an entry in the s-box in a particular manner well known in the field.

To implement AES (having 128 bit blocks, and 10 rounds) arithmetically involves the following operations: (1) 11 AddRoundKey operations (1 prior to 10 rounds); (2) 10 Sub-Byte operations, (3) 10 ShiftRow Operations, and (4) 9 Mix-Column Operations. Each round of rounds 1 to 9 consists of operations (1) to (4), where output from one operation is input to the next operation, and output from operation (4) is input to operation (1). Round 10 consists of operations (1) to (3), where output from operation (3) is the output used. Arithmetic implementations of AES do not provide much security against an attacker recovering a secret key, if the attacker has privileged access to the system implementing the cipher.

Many encryption algorithms are primarily concerned with producing encrypted data that is resistant to decoding by an attacker who can interact with the encryption algorithm only as a "black box" (input-output) model, and cannot observe internal workings of the algorithm or memory contents, etc due to lack of system access. The black box model is appropriate for applications where trusted parties control the computing systems for both encoding and decoding ciphered materials.

However, many applications of encryption do not allow for the assumption that an attacker cannot access internal workings of the algorithm. For example, encrypted digital media often needs to be decrypted on computing systems that are completely controlled by an adversary (attacker). There are many degrees to which the black box model can be relaxed. An extreme relaxation is called the "white box" model. In a white box model, it is presumed that an attacker has total access to the system performing an encryption, including being able to observe directly a state of memory, program execution, and so on. In such a model, an encryption key can be observed in or extracted from memory, and so ways to conceal operations indicative of a secret key are important.

The publication "White-Box Cryptography in an AES implementation" Lecture Notes in Computer Science Vol. 2595, Revised Papers from the 9th Annual International Workshop on Selected Areas in Cryptography pp. 250-270 (2002) by Chow et al. discloses implementations of AES that obscure the operations performed during AES by using table lookups to obscure the secret key within the lookup tables, and obscure intermediate state information that would otherwise be available in arithmetic implementations of AES.

Chow et al. (for his "white box" implementation where the key is known at the computer code compilation time) uses 160 separate tables to implement the 11 AddRoundKey operations and 10 SubByte Operations (10 rounds, with 16 tables per round, where each table is for 1 byte of the 16 byte long—128 bit—AES block). These 160 tables embed a particular AES key, such that output from lookups involving these tables embeds data that would normally result from the AddRoundKey and SubByte operations of the AES algorithm, except that this data includes input/output permutations that make it more difficult to determine what parts of these tables represent round key information derived from the AES key.

Chow et al. uses 1008 separate tables to implement the nine MixColumn Operations (there is no MixColumn operation in the $10^{th}$ round of AES). One type of these tables implements a multiplication of one byte with the AES MixColumn polynomial (per the specification), and another type implements the logical XOR (exclusive OR) part of MixColumn. Each table is used once during the nine rounds.

The Chow et al. solution is clever, but several attacks already have been made on it. Chow et al.'s white-box implementation of a given block cipher encryption process decomposes the block cipher (with its key) as a set of table-lookups. The table-lookups are then masked using permutation functions. (A permutation as used here refers to a bijection operation that changes the order of bits in a data byte or word in a predetermined fashion.) This is explained in Chow et al., and this method can be extended to any block cipher.

The most recent and the most powerful such extension was published by Olivier Billet et al. "Cryptanalysis of a White Box AES Implementation" in SAC 2004, LNCS 3357 pp. 227-240, 2005. The details of the processed basic operations are necessary to mount this attack. This means the attacker has to distinguish the set of operations to extract the operations per rounds, the MixColumn operation, etc.

SUMMARY

The present method and its associated apparatus, which are intended to thwart such attacks, include constructing an AES (or other cryptographic algorithm including any block cipher algorithm) implementation as a set of basic table operations which are each undistinguishable from one another and are masked. Thereby the attacker is lost in or confused by the computer code embodying the cipher (for a passive attack) and/or in the computer code execution path (for an active attack). This approach is also implementable in a hardware (circuit based) apparatus designed to carry out the cryptographic process.

The above-referenced Billet et al. attack is a process decomposed into a set of basic problems to gain information step-by-step on the masks used to hide the cipher operations and the key. When the masks are known it is then easy to recover the cipher key itself.

The Billet et al attack enables the attacker to recover the non-linear part of the output transforms as soon as the attacker is able to regroup tables that make up a round of the AES algorithm. For instance, Billet et al. shows how to recover the non-linear part of the functions Q used in the MixColumns "box" 10 such as shown in FIG. 1, from Billet et al and which shows one of the four mappings in box 10 between four input bytes and four output bytes. The input bytes are $x_0, x_1, x_2, x_3$, and the output bytes are $y_0, y_1, y_2, y_3$. Each such box is constructed of four 8 bit to 8 bit permutations with respective output permutations. Q. So in a first phase, one recovers the role of each of the tables that appear in memory in order to be able to compute the tables that are involved in one AES round, to construct the following combination of operations for one round.

A goal of the present cryptographic process is to make this task harder. Indeed, in the current well known version of AES, some tables are bigger than others and some operations are not "white-boxed." The MixColumn tables as in FIG. 1 have a size of 8×32 elements instead of 8×8 elements of the other tables. Furthermore, certain tables' outputs are logically XORed (exclusive OR), contrary to the outputs of the other tables.

Since the operations are thereby distinguishable, it is possible for the attacker in a white box environment to determine when an AES round finishes and when a new one begins.

A goal of the present method is to construct such tables to all be each of exactly the same size, thereby hardening drastically against such an attack. Due to the structure of the computation of the AES cipher algorithm, one may use tables of sizes 8-bit input×4-bit output (which has a size of 128 bytes), 16-bit input×8-bit output (65 Kbytes) or 32-bit input× 16-bit output (8 GBytes). An exemplary choice is tables each of size 8-bit (one byte)×4-bit (1 nibble). The following presents this process with an 8×4 table size, but the process is readily generalized to other table sizes. Note that these tables are for permutation and logical operations; they are not the "S-box" substitution operations characteristic of the AES cipher.

Incorporated by reference here in their entireties are commonly owned U.S. Patent Application Publications US 2009/0252327A1 "Combination White Box/Black Box Cryptographic Processes and Apparatus" Ciet et al., now issued as U.S. Pat. No. 8,165,286 and US 2010/0054461A1 "Systems and Methods for Implementing Block Cipher Algorithms on Attacker-Controlled Systems" Ciet et al., now issued as U.S. Pat. No. 8,175,265.

Figure 8C:
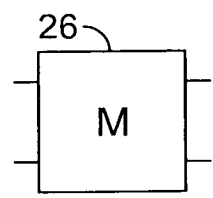
Figure 8C:
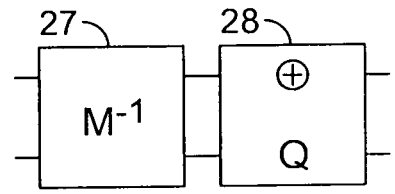
Figure 8C:
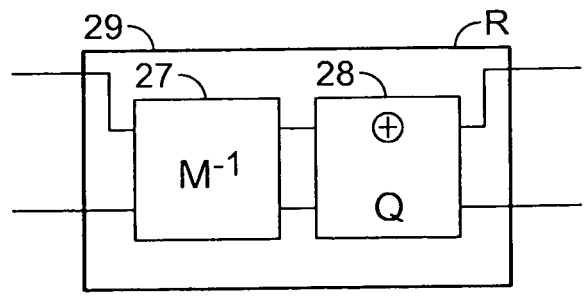

FIGS. 8A, 8B, and 8C show a mask permutation.

Figure 9:
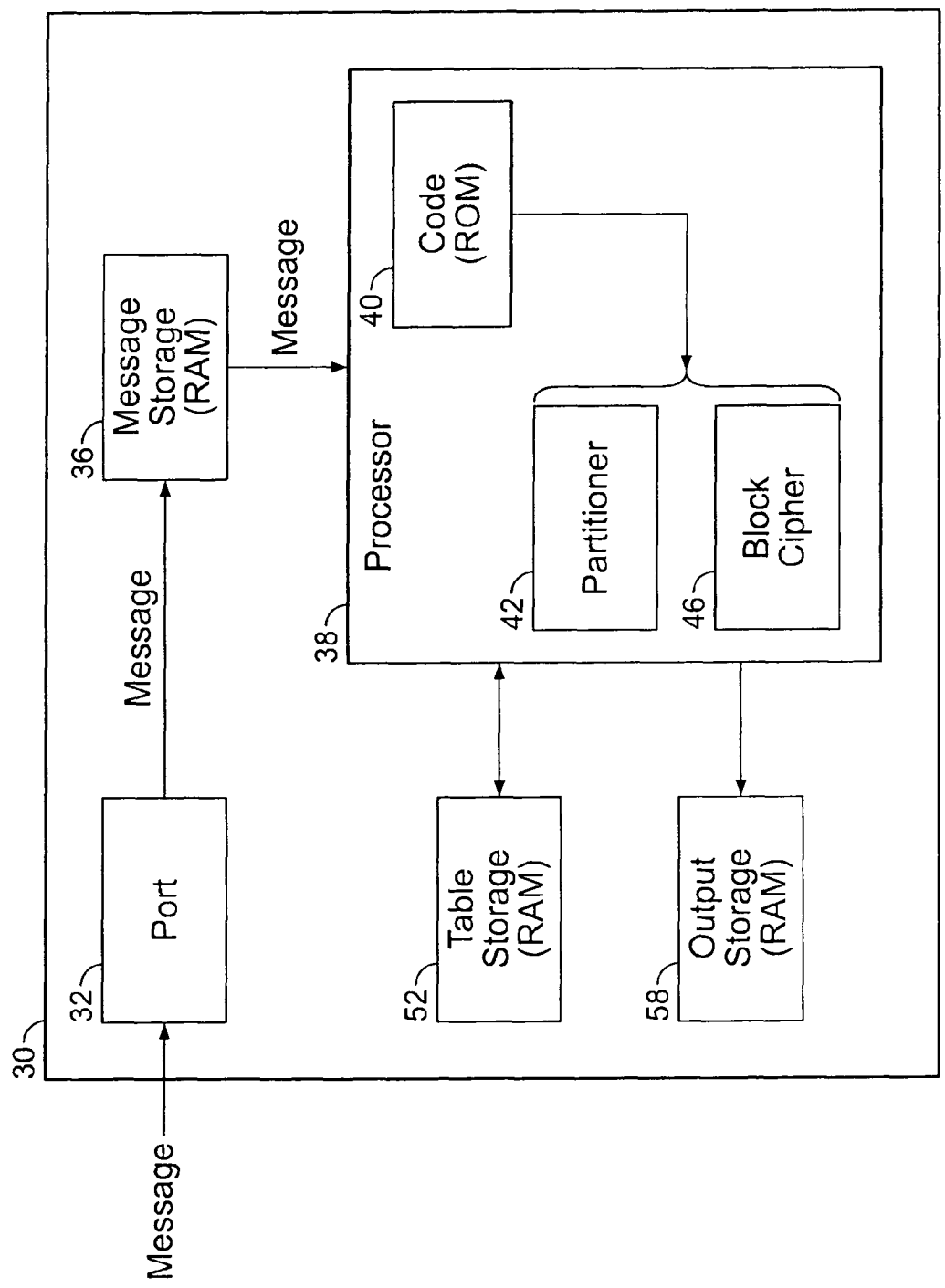

FIG. 9 shows a computing system.

Figure 10:
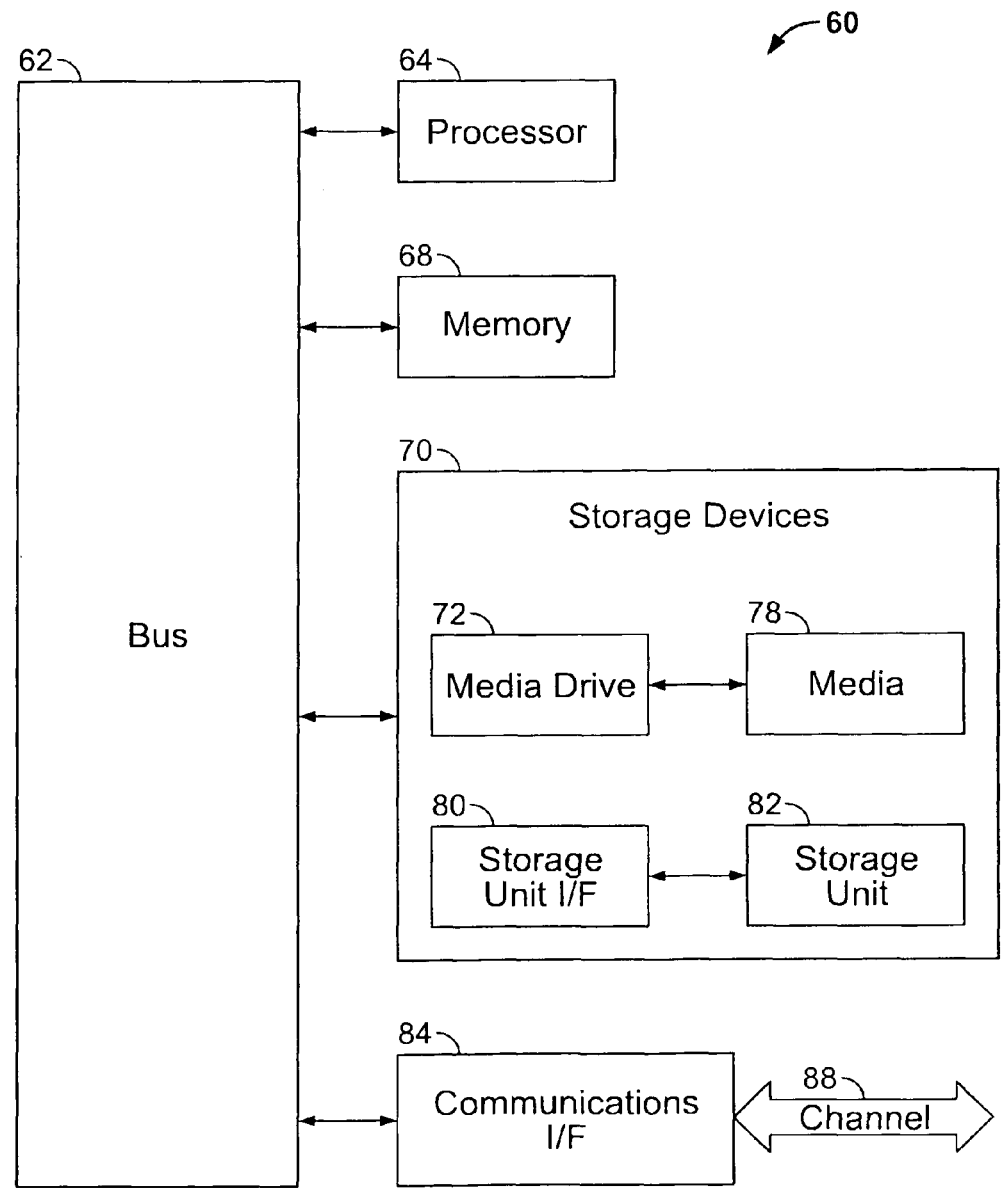

FIG. 10 shows detail of the FIG. 9 system.

DETAILED DESCRIPTION

The tables of the type described above input a data byte but only return a data nibble (a nibble is a half byte). Considering the AES cipher as an example, the present inventors have determined that two kinds of 8×4 tables are sufficient for the AES algorithm:

(a) The tables that implement 8-bit input (2 nibbles) with a 4-bit (1 nibble) output are thus restricted to one nibble on the output side. In this case, to represent a permutation function of one byte of input data, two each 8×4 tables are required.

(b) The tables that implement the logical XOR operation on masked nibbles. These tables input two masked nibbles, compute the logical XOR of the two nibbles on a bit by bit basis and return a single masked nibble:

Having same size tables in accordance with the invention does not imply the tables are indistinguishable. This is even the case if the tables are masked using input and output permutations. The present inventors have identified a first way to distinguish between tables which an attacker can use. So even if all the involved tables have the same size, they are easily distinguishable. Indeed, an XOR operation table is the table of a group law. Hence for any nibble, there exists a unique nibble such that the output through the "box" (table) is 0. (The term "box" refers to a table or logical or mathematical operation embodied in a table, not to the "white box" environment.) This property (distinguisher) is also verified for any value in the group $[1, 2^4-1]$, which are the other possible outputs of the XOR operation table.

This last property ensures that each output of an XOR operation table has exactly 16 pre-images. (A pre-image in cryptography is a value or values that maps to a particular output.) Hence, if XOR operation tables are used within a computation, an attacker is able to detect them using a known pre-image attack and is able to obtain useful information on the implementation including the structure of such tables.

The present inventors also identified a second way (property) to distinguish between these two types of tables. Each 8×4 table, which represents half of a permutation, necessarily has a "twin" table that is the second part of the permutation. A "twin" to a particular table A is table B if the concatenation table C of A and B in the sense that C[i]=A[i]||B[i], A, B and C accept the same input and for any input, the output of table C is the concatenation of the A and B outputs and C is a permutation, where "||" denotes concatenation. So given a particular XOR operation table A, it does not necessarily have a twin table B present in any particular cryptographic algorithm. But it is indeed possible to construct such a table B. So in the present process such an additional table B is constructed for each XOR operation table A, and these additional tables B are used. Note that in order to economize on computer code in a software embodiment, one can construct input and output permutations on two such XOR operation tables such they are twins.

An 8×4 table that implements an XOR operation has no such twin as explained above since it inputs two nibbles and returns a single nibble. Hence a priori, among a set of 8×4 tables, it is easy to distinguish an XOR operation table from other tables, and this undesirably gives information on the implementation to the attacker regarding the type of table.

The following is a computationally efficient method for hiding the nature of a table which is either part of a permutation or is an XOR operation table, so as to defeat these two ways of distinguishing tables. Let a data byte designated X be the concatenation of two nibbles designated $X_0$ and $X_1$, expressed algebraically as:

$$X_0 \| X_1.$$

Figure 1:
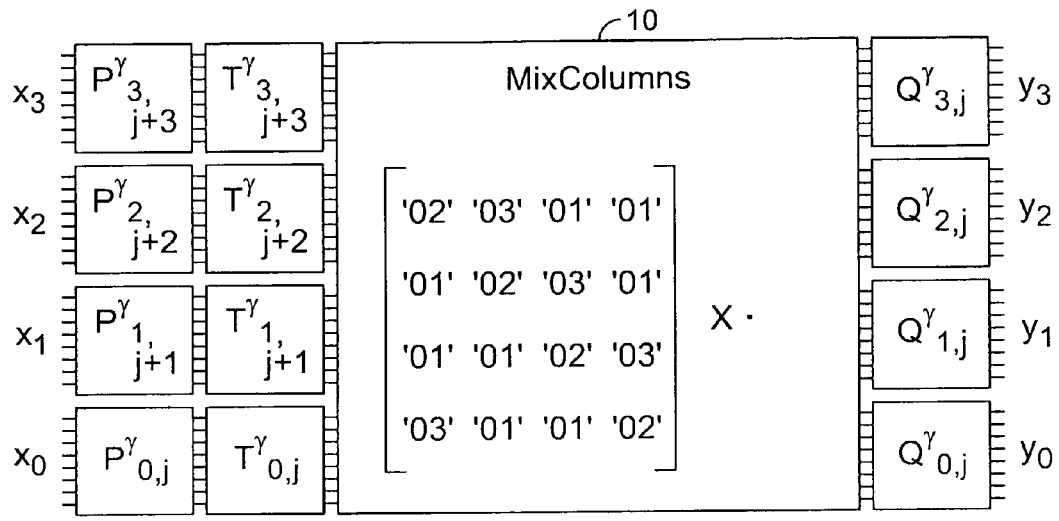
FIG. 1 shows in the prior art a mapping for the AES Mix-Columns Operation.
Figure 2:
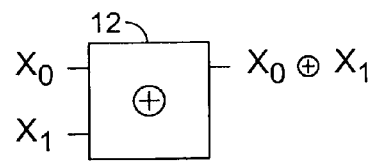
FIG. 2 shows diagrammatically an XOR operation table or "box".

Here, the XOR operation table of inputs $X_0$ and $X_1$ is represented by box 12 in FIG. 2.

Let the result of a permutation designated P on the input byte X ($=X_0\|X_1$) be the concatenation of two permutations designated $P_0$, $P_1$ so $P_0 (X_0\|X_1)$ and P1 $(X_0\|X_1)$, where $P_0$ and $P_1$ are applied on X and not only on one part of X, expressed as:

$$P_0(X_0\|X_1)\|P_1(X_0\|X_1).$$

Figure 3:
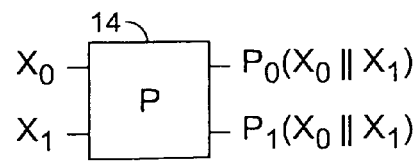
FIG. 3 shows a permutation box.
Figure 4A:
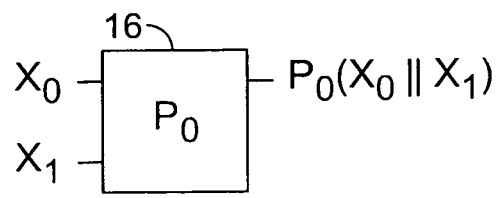
FIGS. 4A, 4B show the permutation of FIG. 3 decomposed.
Figure 4B:
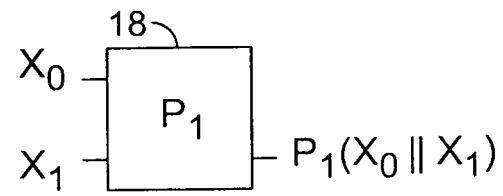

One also represents a permutation P by box 14 of size 8×8 as shown in FIG. 3. As explained above, a permutation can be decomposed into two sub tables $P_0$ 16 and $P_1$ 18 as shown respectively in FIGS. 4A, 4B.

Figure 5:
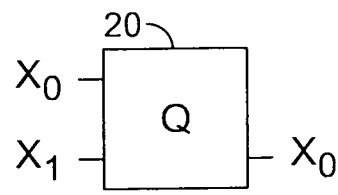
FIG. 5 shows a twin of an XOR table.
Figure 6:
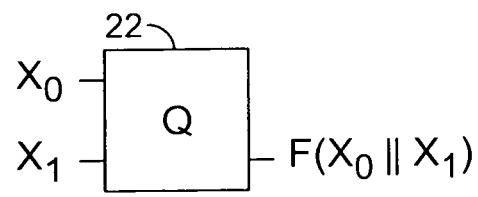
FIG. 6 shows a general form of the FIG. 5 table.

The following describes constructing a twin table for the XOR operation table to defeat the second way of distinguishing between tables. As explained above, the XOR operation table in the algorithm does not have any twin table, which is defined (see above) as a table that makes a permutation when it is associated with the XOR operation table. However, constructing such a table is readily accomplished. Indeed, there exist many tables that are a twin of the XOR table. For instance the function 20 designated Q shown in FIG. 5 is one of them. The general form of such a table 22 is shown in FIG. 6 where F is a function such that the function designated ϕ, that takes as input byte ($X_0$, $X_1$) and outputs:

$$\phi(X_0, X_1) = (X_0 \oplus X_1, F(X_0, X_1)) \text{ and which is a bijection.}$$

Figure 7:
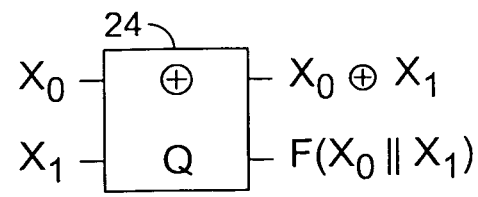
FIG. 7 shows a completed XOR table.

The following describes making the XOR tables indistinguishable thereby defeating the first way of distinguishing. This involves hiding the property on the number of pre-images of the XOR operation tables. Assume that there is permutation that is a completed XOR operation table 24 as described above and shown in FIG. 7. To hide that its upper part is made from an XOR operation table, in a first step, one computes two permutations designated respectively M and R such that for all nibbles $X_0$ and $X_1$ where M is the mask 26 in FIG. 8A, and R is the concatenation of $M^{-1}$ and Q in FIG. 8B:

$$M(R(X_0, X_1)) = (X_0 \oplus X_1, F(X_0, X_1))$$

The letter M indicates "mask," since this permutation masks that the table is actually an XOR operation table. Permutation M 26 as show in FIG. 8A is randomly selected, e.g., from a predetermined set of permutations. This selection is typically performed when the computer source code is compiled into object (executable) code. From the inverse permutation of M designated $M^{-1}$ one computes the composition of $M^{-1}$ with the completed XOR operation table. There are now two permutations $M^{-1}$ 27 and Q 28 as shown in FIG. 8B which combine into permutation R 29 in FIG. 8C. Advantageously, none of these permutations, taken separately, have any particular property which would enable an attacker to distinguish them from a random permutation.

In a second step of the masking, one masks the output of the XOR operation table. Indeed, it is in general better for security never to expose the correct data in the computation. To do so, two methods can be applied:

(a) The first method includes computing a 4×4 random permutation and composing it with the upper part of second permutation.

(b) The second method includes computing an 8×8 random permutation and composing it with the entire second permutation.

In both cases, the inverse of the last computed permutation is reused. Indeed, the goal is to have a set of permutations that can be chained.

So in accordance with the invention one is able to represent any table of a white-box implementation of AES or a similar cryptographic algorithm as a set of indistinguishable table-lookups using the above described construction of these tables.

The resulting cipher process is expressed (in computer code or hardware) as a set of indistinguishable table-lookups of tables each of size 8×4 for example. This makes it hard for an attacker to retrieve what does correspond to a complete round to mount his attack since it is difficult for him to determine when each round begins or ends. This is especially true when several "useless" operations (each involving an additional permutation) are added where desired in the process to add complexity and where these additional and useless tables are indistinguishable from the useful ones. These additional permutations enhance security by making some rounds of the cryptographic algorithm longer than others. In another embodiment, additional operations of this type are added on a per-byte basis within each round.

The present method can be extended to cryptographic processes using tables of other sizes such as 18×8 or 32×16. However 8×4 tables may be preferred.

FIG. 9 shows in a block diagram relevant portions of a computing device (system) 30 in accordance with the invention decryption. This is, e.g., a computer, mobile telephone, Smart Phone, personal digital assistant or similar device, or part of such a device and includes conventional hardware components executing in one embodiment software (computer code) embodying the above examples of a cryptographic (e.g., encryption or decryption) process. This code may be, e.g., in the C or C++ computer language or its functionality may be expressed in the form of firmware or hardware (circuitry) logic; writing such code or designing such logic would be routine in light of the above disclosure.

The computer code is conventionally stored in code memory (computer readable storage medium, e.g., ROM) 40 (as object code or source code) associated with processor 38 for execution by processor 38. The incoming message (data) to be ciphered or deciphered or otherwise processed is received at port 32 and stored in computer readable storage medium (memory, e.g., RAM) 36 where it is coupled to processor 38. Processor 38 conventionally partitions the message into suitable sized blocks at software partitioning module 42. Other software (code) modules in processor 38 include the algorithm module 46 which carries out the block cipher cryptographic algorithm functionality set forth above.

Also coupled to processor 38 is the computer readable storage medium (memory) 52 for storing the tables, as well as a third storage 58 for the resulting output data, e.g., the decrypted or encrypted input data. Storage locations 36, 52, 58 may be in one or several conventional physical memory devices (such as semiconductor RAM or its variants or a hard disk drive).

Electric signals are conventionally carried between the various elements of FIG. 9. Not shown in FIG. 9 is the subsequent conventional use of the resulting ciphered or deciphered message.

FIG. 10 shows further detail of the computing device in one embodiment. FIG. 10 illustrates a typical and conventional computing system 60 that may be employed to implement processing functionality in embodiments of the invention and shows additional detail of the FIG. 9 system. Computing systems of this type may be used in a computer server or user (client) computer or other computing device, for example. Those skilled in the relevant art will also recognize how to implement embodiments of the invention using other computer systems or architectures. Computing system 60 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 60 can include one or more processors, such as a processor 64 (equivalent to processor 38 in FIG. 9). Processor 64 can be implemented using a general or special purpose processing engine such as, for example, a microprocessor, microcontroller or other control logic. In this example, processor 64 is connected to a bus 62 or other communications medium.

Computing system 60 can also include a main memory 68 (equivalent to memories 36, 52, 58), such as random access memory (RAM) or other dynamic memory, for storing information and instructions to be executed by processor 64. Main memory 68 also may be used for storing temporary variables or other intermediate information during execution of instructions to be executed by processor 64. Computing system 60 may likewise include a read only memory (ROM) or other static storage device coupled to bus 62 for storing static information and instructions for processor 64.

Computing system 60 may also include information storage system 70, which may include, for example, a media drive 62 and a removable storage interface 80. The media drive 72 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 78 may include, for example, a hard disk, floppy disk, magnetic tape, optical disk, CD or DVD, or other fixed or removable medium that is read by and written to by media drive 72. As these examples illustrate, the storage media 78 may include a computer-readable storage medium having stored therein particular computer software or data.

In alternative embodiments, information storage system 70 may include other similar components for allowing computer programs or other instructions or data to be loaded into computing system 60. Such components may include, for example, a removable storage unit 82 and an interface 80, such as a program cartridge and cartridge interface, a removable memory (for example, a flash memory or other removable memory module) and memory slot, and other removable storage units 82 and interfaces 80 that allow software and data to be transferred from the removable storage unit 78 to computing system 60.

Computing system 60 can also include a communications interface 84 (equivalent to port 32 in FIG. 9). Communications interface 84 can be used to allow software and data to be transferred between computing system 60 and external devices. Examples of communications interface 84 can include a modem, a network interface (such as an Ethernet or other network interface card (NIC)), a communications port (such as for example, a USB port), a PCMCIA slot and card, etc. Software and data transferred via communications interface 84 are in the form of signals which can be electronic, electromagnetic, optical or other signals capable of being received by communications interface 84. These signals are provided to communications interface 84 via a channel 88. This channel 88 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 68, storage device 78, or storage unit 82. These and other forms of computer-readable media may store one or more instructions for use by processor 64, to cause the processor to perform specified operations. Such instructions, generally referred to as "computer program code" (which may be grouped in the form of computer programs or other groupings), when executed, enable the computing system 60 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 60 using, for example, removable storage drive 74, drive 72 or communications interface 84. The control logic (in this example, software instructions or computer program code), when executed by the processor 64, causes the processor 64 to perform the functions of embodiments of the invention as described herein.

This disclosure is illustrative and not limiting. Further modifications will be apparent to these skilled in the art in light of this disclosure and are intended to fall within the scope of the appended claims.

The invention claimed is:

1. A machine implemented method of protecting a message with a cipher process, the method comprising:
    receiving a message at a machine; and
    applying a plurality of ciphering permutations to the message, wherein the ciphering permutations are expressed on the machine as sets of equally sized tables, and wherein each ciphering permutation comprises a composition of (i) a concatenation of an exclusive OR table with a twin table and (ii) an inverse of a randomly generated masking permutation, wherein the twin table is constructed so that the concatenation of the twin table and the exclusive OR table is a bijective permutation and conceals that the concatenation contains the exclusive OR table.

2. The method of claim 1, wherein each table accepts one data byte as input and outputs one half a data byte.

3. The method of claim 1, wherein a size of each table is 8 bits input and 4 bits output.

4. The method of claim 1, wherein a size of each table is 16 bits input and 8 bits output.

5. The method of claim 1, wherein a size of each table is 32 bits input and 16 bits output.

6. The method of claim 1, wherein the plurality of ciphering permutations are part of a block cryptographic process that conforms to the Advanced Encryption Standard.

7. The method of claim 1, wherein encryption keys are embedded in the ciphering permutations.

8. The method of claim 1, wherein the cipher process is one of encryption, decryption, or calculating a digital signature.

9. The method of claim 1, wherein an input to at least one of the exclusive OR tables of the ciphering permutations is masked.

10. The method of claim 1, wherein the ciphering permutations are each performed on a bit-by-bit basis.

11. The method of claim 1, wherein the plurality of ciphering permutations are applied to the message during a plurality of rounds of the cipher process.

12. The method of claim 1, wherein each ciphering permutation includes two of the equally sized tables.

13. The method of claim 12, wherein a first of the two tables is the exclusive OR table and the second of the two tables is the twin table.

14. The method of claim 1, wherein the randomly generated masking permutation is generated at run time.

15. The method of claim 1, wherein, for a particular ciphering permutation, the randomly generated masking permutation is used in a previous ciphering permutation.

16. The method of claim 1, wherein the inverse of the randomly generated masking permutation is composited with both the exclusive OR table and net the twin table.

17. The method of claim 1, wherein the inverse of the randomly generated masking permutation is a same size as the concatenation of the exclusive OR table and the twin table.

18. The method of claim 1, wherein a key for the cipher process is stored on the machine.

19. The method of claim 1 further comprising applying a plurality of non-ciphering permutations to the message.

20. An apparatus comprising:
a port for receiving messages;
a set of processing units for executing sets of instructions;
a memory for storing a program which when executed by at least one of the processing units applies a cipher process to the messages, the program comprising sets of instructions for:
applying a plurality of ciphering permutations to the messages, wherein the ciphering permutations are expressed on the apparatus as sets of equally sized tables, and wherein each ciphering permutation comprises a composition of (i) a concatenation of an exclusive OR table with a twin table and (ii) an inverse of a randomly generated masking permutation, wherein the twin table is constructed so that the concatenation of the twin table and the exclusive OR table is a bijective permutation and conceals that the concatenation contains the exclusive OR table.

21. The apparatus of claim 20, wherein a size of each table is 8 bits input and 4 bits output.

22. The apparatus of claim 20, wherein a size of each is 16 bits input and 8 bits output.

23. The apparatus of claim 20, wherein a size of each table is 32 bits input and 16 bits output.

24. The apparatus of claim 20, wherein the plurality of ciphering permutations are part of a block cryptographic process that conforms to the Advanced Encryption Standard.

25. The apparatus of claim 20, wherein encryption keys are embedded in the ciphering permutations.

26. The apparatus of claim 20, wherein the cipher process is one of encryption, decryption, or calculating a digital signature.

27. The apparatus of claim 20, wherein an input to at least one of the exclusive OR tables of the ciphering permutations is masked.

28. The apparatus of claim 20, wherein the ciphering permutations are executed on a bit-by-bit basis.

29. The apparatus of claim 20, wherein each ciphering permutation includes two of the equally sized tables.

30. The apparatus of claim 29, wherein a first of the two tables is the exclusive OR table and the second of the two tables is the twin table.

31. The apparatus of claim 20, wherein the inverse of the randomly generated masking permutation is composited with both the exclusive OR table and the twin table.

32. The apparatus of claim 20, wherein the inverse of the randomly generated masking permutation is a same size as the concatenation of the exclusive OR table and the twin table.

33. The apparatus of claim 20, wherein the apparatus further comprises a storage for a cryptographic key for the program.

34. The apparatus of claim 20, wherein the program further comprises a set of instructions for applying a set of non-ciphering permutations to the messages.

35. A non-transitory machine readable medium storing a program for execution by at least one processing unit on a machine, the program comprising sets of instructions for:
receiving a message comprising sets of bits; and
applying a plurality of ciphering permutations to the message, wherein the ciphering permutations are expressed on the machine as sets of equally sized tables, and wherein each ciphering permutation comprises a composition of (i) a concatenation of an exclusive OR table with a twin table and (ii) an inverse of a randomly generated masking permutation, wherein the twin table is constructed so that the concatenation of the twin table and the exclusive OR table is a bijective permutation and conceals that the concatenation contains the exclusive OR table.

36. The non-transitory machine readable medium of claim 35, wherein a size of each table is 8 bits input and 4 bits output.

37. The non-transitory machine readable medium of claim 35, wherein each ciphering permutation includes two of the equally sized tables.

38. The non-transitory machine readable medium of claim 37, wherein a first of the two tables is the exclusive OR table and the second of the two tables is the twin table.

39. The non-transitory machine readable medium of claim 35, wherein the program further comprises a set of instructions for applying a set of non-ciphering permutations to the message.

40. The non-transitory machine readable medium of claim 35, wherein the inverse of the randomly generated masking permutation is composited with both the exclusive OR table and the twin table.

* * * * *